United States Patent
Menozzi et al.

(10) Patent No.: US 9,441,066 B2
(45) Date of Patent: Sep. 13, 2016

(54) USE OF PHOTOSENSITIVE MOLECULES AND METAL COMPLEXES AS OXYGEN SCAVENGER ELEMENTS

(75) Inventors: Edoardo Menozzi, Basel (CH); Massimiliano Sala, Castelnuovo Rangone (IT); Enrico Galfré, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/511,237

(22) PCT Filed: Nov. 29, 2010
(Under 37 CFR 1.47)

(86) PCT No.: PCT/EP2010/068371
§ 371 (c)(1),
(2), (4) Date: Aug. 13, 2012

(87) PCT Pub. No.: WO2011/067196
PCT Pub. Date: Jun. 9, 2011

(65) Prior Publication Data
US 2012/0305850 A1 Dec. 6, 2012

(30) Foreign Application Priority Data
Dec. 2, 2009 (EP) .................................. 09177743

(51) Int. Cl.
| | | |
|---|---|---|
| *C08K 5/098* | (2006.01) | |
| *C08K 5/3417* | (2006.01) | |
| *C08K 5/3437* | (2006.01) | |
| *C08K 5/42* | (2006.01) | |
| *C08F 290/00* | (2006.01) | |
| *B32B 27/08* | (2006.01) | |
| *B32B 27/18* | (2006.01) | |
| *C08L 23/00* | (2006.01) | |
| *C08L 23/06* | (2006.01) | |
| *C08K 5/132* | (2006.01) | |
| *C08L 45/00* | (2006.01) | |
| *C08L 57/00* | (2006.01) | |

(52) U.S. Cl.
CPC ............. *C08F 290/00* (2013.01); *B32B 27/08* (2013.01); *B32B 27/18* (2013.01); *C08L 23/00* (2013.01); *C08L 23/06* (2013.01); *C08K 5/098* (2013.01); *C08K 5/132* (2013.01); *C08K 2201/012* (2013.01); *C08L 45/00* (2013.01); *C08L 57/00* (2013.01)

(58) Field of Classification Search
CPC .. C09K 15/32; C08K 5/3447; C08K 5/3495; C08K 5/098; C08K 5/42; C08K 2201/012; B32B 27/32

USPC ........................................ 428/704; 523/100
See application file for complete search history.

(56) References Cited

U.S. PATENT DOCUMENTS

| | | | |
|---|---|---|---|
| 2,320,716 A | 6/1943 | Corkery et al. | |
| 5,627,234 A * | 5/1997 | Giordano et al. | ............... 525/89 |
| 5,744,056 A | 4/1998 | Venkateshwaran | |
| 6,139,770 A | 10/2000 | Katsumoto et al. | |
| 6,369,148 B2 | 4/2002 | Chiang et al. | |
| 6,464,896 B1 | 10/2002 | Speer et al. | |
| 6,586,514 B2 | 7/2003 | Chiang et al. | |
| 6,607,795 B1 * | 8/2003 | Yang | ........................ B01J 20/26 252/186.24 |
| 7,056,983 B2 * | 6/2006 | Nakagawa | ............ C08F 290/02 525/242 |
| 2002/0020832 A1 * | 2/2002 | Oka et al. | ...................... 252/500 |
| 2003/0236325 A1 * | 12/2003 | Bonora | ................... C08K 5/098 524/99 |
| 2007/0098936 A1 | 5/2007 | Tung et al. | |
| 2009/0076206 A1 * | 3/2009 | Gardi | ........................ C08K 3/22 524/360 |
| 2009/0286060 A1 * | 11/2009 | Sala | ...................... C07D 209/48 428/220 |
| 2010/0222454 A1 | 9/2010 | Sala et al. | |
| 2011/0017611 A1 | 1/2011 | Menozzi et al. | |
| 2011/0105639 A1 | 5/2011 | Menozzi et al. | |
| 2012/0175555 A1 | 7/2012 | Menozzi et al. | |
| 2012/0187345 A1 | 7/2012 | Menozzi et al. | |
| 2012/0263974 A1 * | 10/2012 | Menozzi et al. | ............... 428/704 |

FOREIGN PATENT DOCUMENTS

| | | |
|---|---|---|
| EP | 1423456 A1 | 6/2004 |
| JP | 2006-037068 | 2/2006 |
| JP | 2006-312715 | 11/2006 |
| JP | 2009-215440 | 9/2009 |
| JP | 2010-535257 | 11/2010 |
| WO | WO9851758 * | 5/1997 |
| WO | 9851758 A1 | 11/1998 |
| WO | 9851759 A1 | 11/1998 |
| WO | 9948963 A2 | 9/1999 |
| WO | 2006/099895 A1 | 8/2006 |
| WO | 2009016083 A1 | 2/2009 |

OTHER PUBLICATIONS

Copending U.S. Appl. No. 13/511,231, filed May 22, 2012.
Copending U.S. Appl. No. 13/511,162, filed May 22, 2012.

* cited by examiner

*Primary Examiner* — Lorna Douyon
*Assistant Examiner* — Preeti Kumar
(74) *Attorney, Agent, or Firm* — Oblon, McClelland, Maier & Neustadt, L.L.P.

(57) ABSTRACT

An oxygen scavenger composition for food packaging application comprising (I) a polymeric resin, (II) one or more oligomeric photosensitizers, (III) a metal salt, preferably Cu stearate or Mn stearate; (IV) a sacrificial oxidizable substrate, and optionally (V) additional components.

13 Claims, No Drawings

USE OF PHOTOSENSITIVE MOLECULES AND METAL COMPLEXES AS OXYGEN SCAVENGER ELEMENTS

It is known that many oxygen sensitive products, including food products such as meat and cheese, smoked and processed luncheon meats, as well as non food products such as electronic components pharmaceuticals and medical products deteriorate in the presence of oxygen. Both the color and the flavor of foods can be adversely affected. The oxidation of lipids within the food product can result in the development of rancidity.

Limiting the exposure to oxygen provides a means to maintain and enhance the quality and shelf-life of the packaged product, especially in the food industry. The removal of oxygen from the packaged foods and building barriers against oxygen penetration during storage represents an important objective for the packaging technologist. For example packaging a food product in a package capable of minimizing oxygen exposure is a means to maintain the quality of the packaged product over an extended time and to retard spoilage of the product so that it is maintained in inventory longer without wastage and the need of restocking and replacement.

In the food packaging industry, several techniques have been developed to limit oxygen sensitive packaged materials to oxygen exposure. Such techniques include the use of barrier material (with low permeability to oxygen) as part of the packaging; the inclusion of items capable of consuming oxygen other then the packaging material (through the use of sachets with material capable of reacting with oxygen); and the creation of a reduced oxygen environment within the package (e.g. modified atmosphere packaging—MAP—and vacuum packaging).

Even if each of the above techniques has its place in the industry, it is well recognized that the inclusion of an oxygen scavenger as a part of the packaging article is one of the most desirable means of limiting oxygen exposure.

U.S. Pat. No. 5,744,056, U.S. Pat. No. 6,369,148 and U.S. Pat. No. 6,586,514 describe an oxygen scavenging composition comprising an oxidizable metal component, an electrolyte component, and a non-electrolytic acidifying component that is thermally stable at thermoplastic resin melt fabrication temperatures. WO2006089895 discloses a similar system wherein the electrolytic component participating in the oxidation reaction is obtained by hydrolysis of a Lewis acid salts and/or theirs adducts. One difficulty with scavenger systems of this type is the relative inefficiency of the oxidation reaction within the polymer matrix. Indeed, the scavenger composition must be employed usually at high loading, leading to cost, compatibility, color and transparency issues. In EP-A-1 423 456 the concentration of the metal is limited to less than 0.25% in order to obtain a more transparent plastic object, limiting significantly its effectiveness.

In this patent the combination of transition metal components with organic and/or inorganic photoactive molecules and sacrificial oxidizable substrates is describe for removing oxygen into a sealed transparent food package and be an excellent tool for increasing the shelf-life stability and preserve organoleptic food properties.

The use of organic photoactive molecules like anthraquinone or benzophenone derivatives in synthetic thermoplastics resin is claimed since the early seventies. Nevertheless these additives furnish various inconveniences because they are generally compounds of low molecular weight. For example, an additive of relatively low boiling point or a sublimable additive undergoes evaporation, sublimation when the resin is molded, formed or otherwise processed under heat.

Furthermore, poor compatibility between the functional agent and the resin causes bleeding or blooming on the surface of the resin during its long-term use. Furthermore, blooming can cause additive leaching particularly undesirable when plastic products are used in contact with food. In this patent such problems have been taken into consideration and oligomeric anthraquinone or benzophenone designed according to the resin's needs, can solve the issues mentioned above.

Thus, while a variety of approaches to maintaining or reducing oxygen levels in packaged items have been advanced, there remains a need for improved oxygen-scavenging composition and packaging materials utilizing the same.

An object of the present invention is therefore to provide improved oxygen-scavenging compositions and packagings. Another object is to provide low costs, oxygen-scavenging compositions of improved efficiency. Another object is to provide oxygen scavenging composition that can be used effectively, even at relatively low levels, in a wide range of active-barrier packaging films and sheets, including laminated and coextruded multilayer films and sheets. Another object is to provide active-barrier packaging containers that can increase the shelf-life of oxygen-sensitive products by slowing the passage of external oxygen into the container, by absorbing oxygen present inside the container or both. Other objects will be apparent to those skilled in the art.

It has been observed that the use of the inventive oxygen-scavenging composition enhances the resistance of the packed food products against the oxygen attact.

Thus the present invention relates to an oxygen-scavenger composition for food packaging application comprising:

(I) A polymeric resin preferably a thermoplastic polymers such as:
  Homo and copolymers of olefin monomers such as ethylene and propylene, but also higher 1-olefins such as 1-butene, 1-pentene, 1-hexene or 1-octen. Preferred is polyethylene LDPE and LLDPE, HDPE and polypropylene;
  Homo- and copolymers of olefin monomers with diolefin monomers such as butadiene, isoprene and cyclic olefins such as norbornene;
  Copolymers of one ore more 1-olefins and/or diolefins with carbon monoxide and/or with other vinyl monomers, including, but not limited to, acrylic acid and its corresponding acrylic esters, methacrylic acid and its corresponding esters, vinyl acetate, vinyl alcohol, vinyl ketone, styrene, maleic acid anhydride and vinyl chloride;
  Polyvinyl alcohol;

(II) One or more oligomeric organic photosensitizers based on benzophenone-3,3',4,4'-tetracarboxylic dianhydride, benzophenone or anthraquinone as defined. The photosensitizer(s) may be present in total in a concentration from 0.001-10 wt %, preferably 0.01-5 wt % and most preferably 0.1-5 wt % based on the polymeric resin. Suitable Oligomeric photosensitizes are described in the WO 2009/016083 A1 from line 18 page 3 to line 8 page 23;
  Photosensitizers derived from benzophenone-3,3',4,4'-tetracarboxylic dianhydride, particularly such given in the following Table:

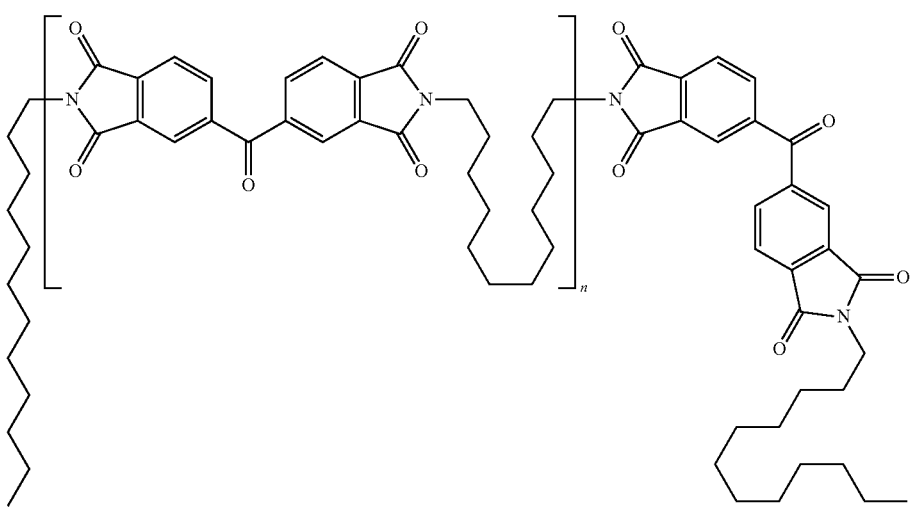
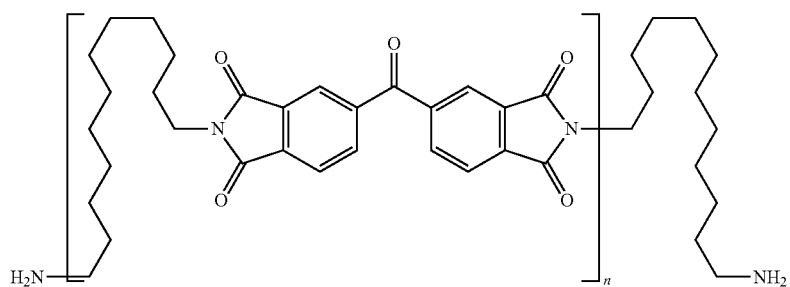
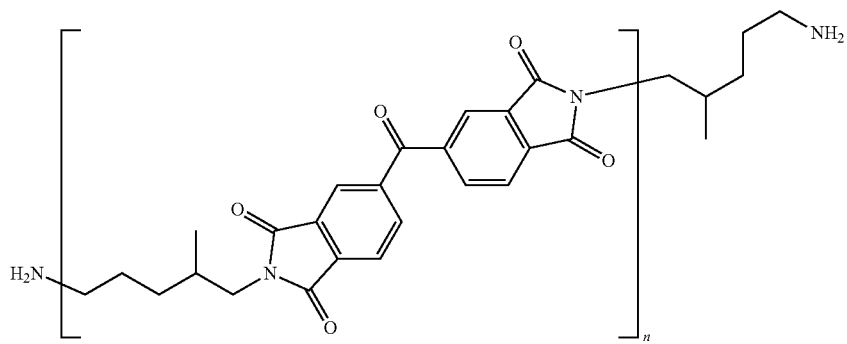
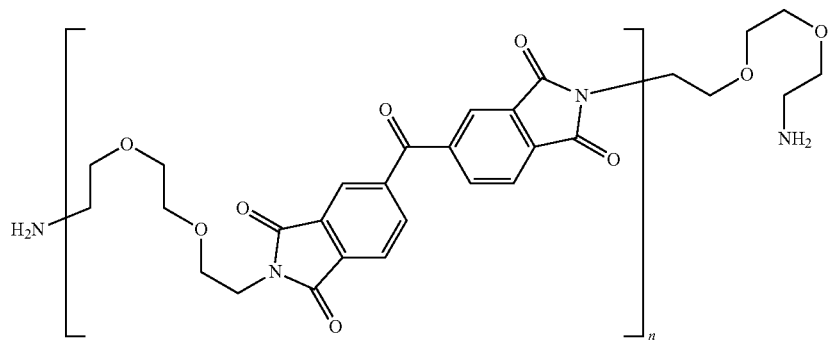

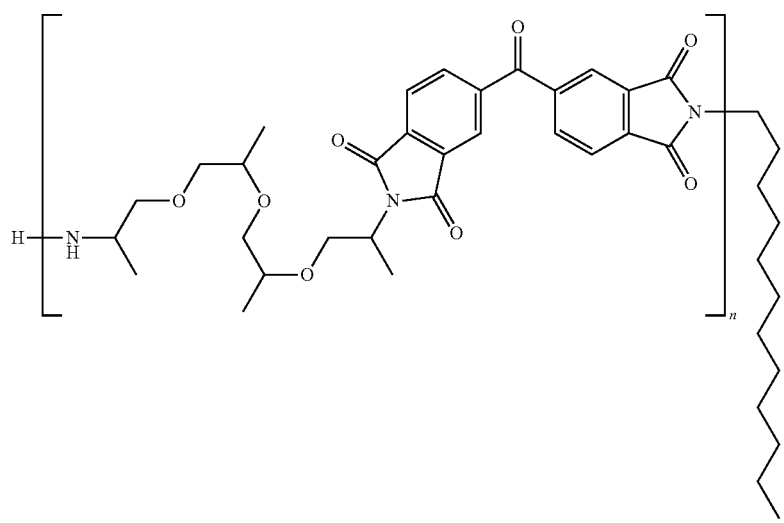
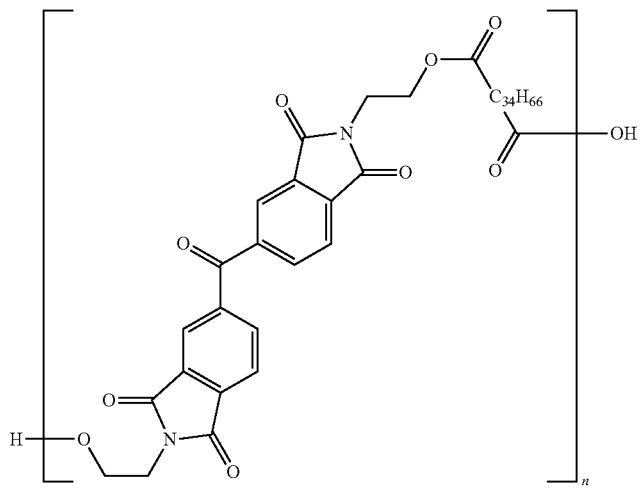
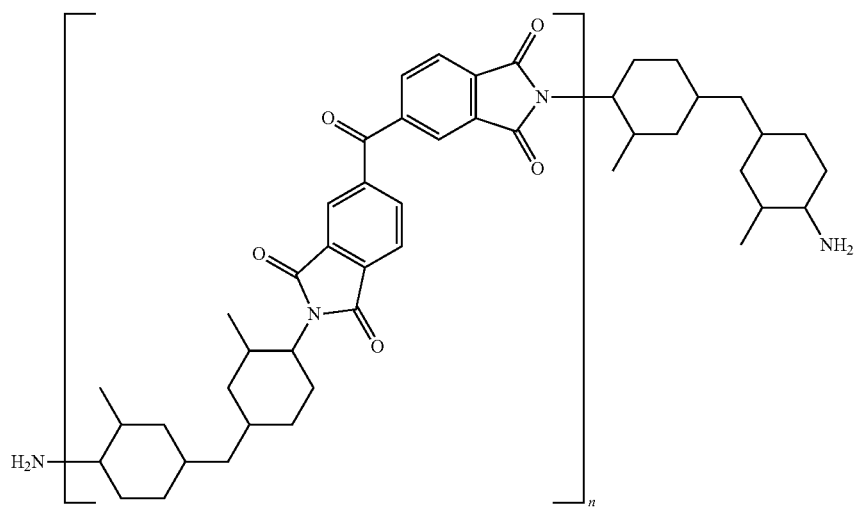

-continued
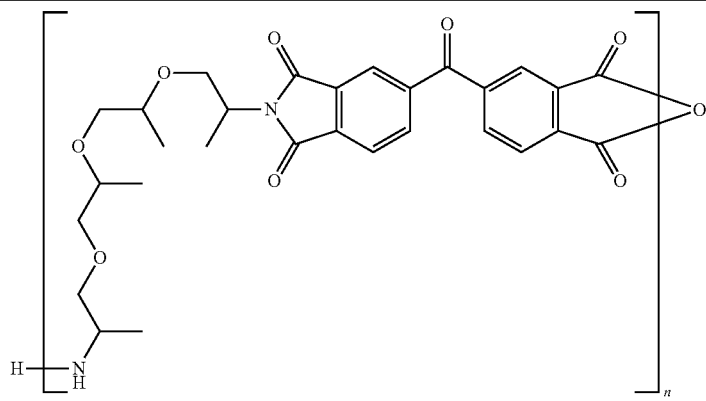
Other benzophenone photosensitizers, particularly such given in the following Table:
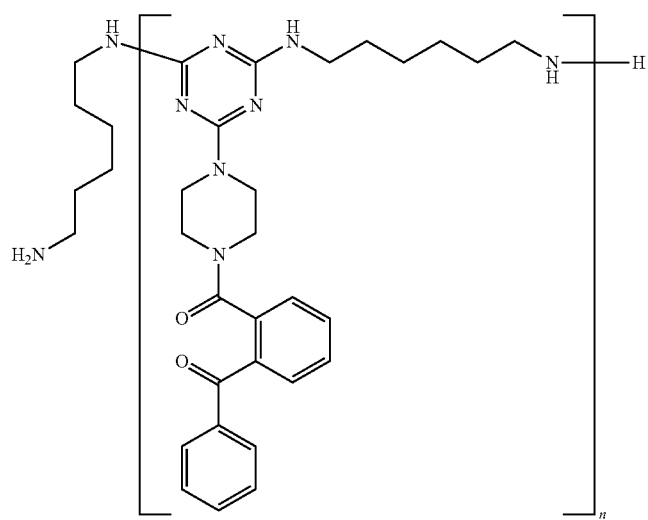
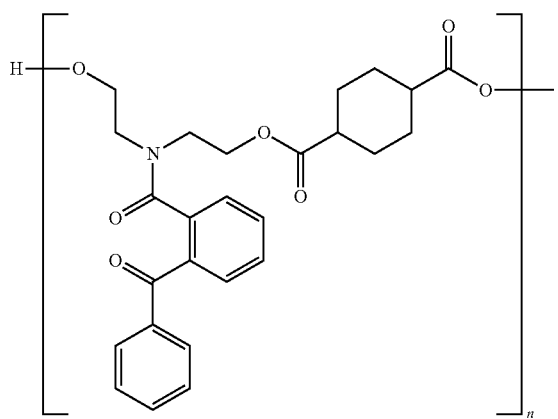

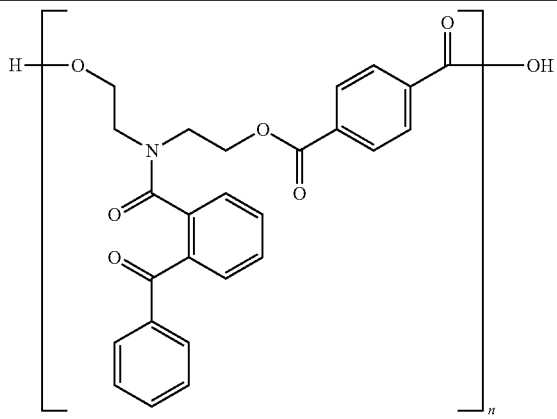
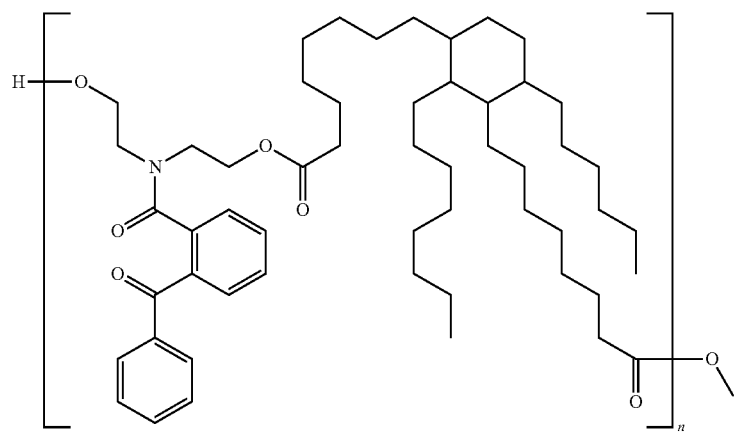
Photosensitizers bearing an anthraquinone core particularly such given in the following Table:
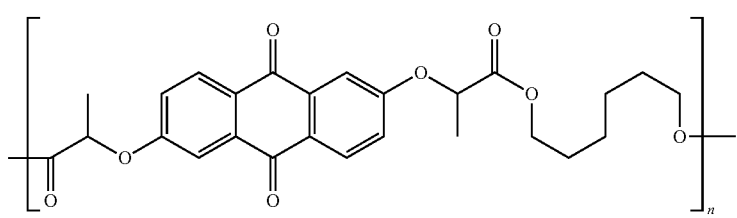
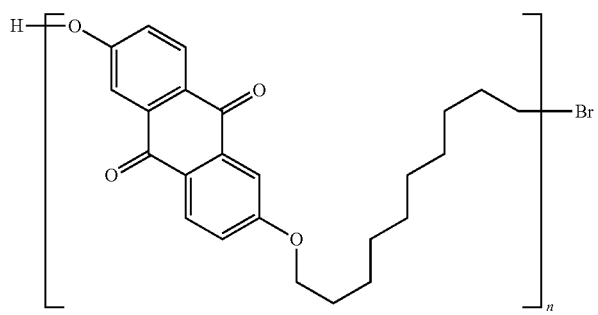

-continued

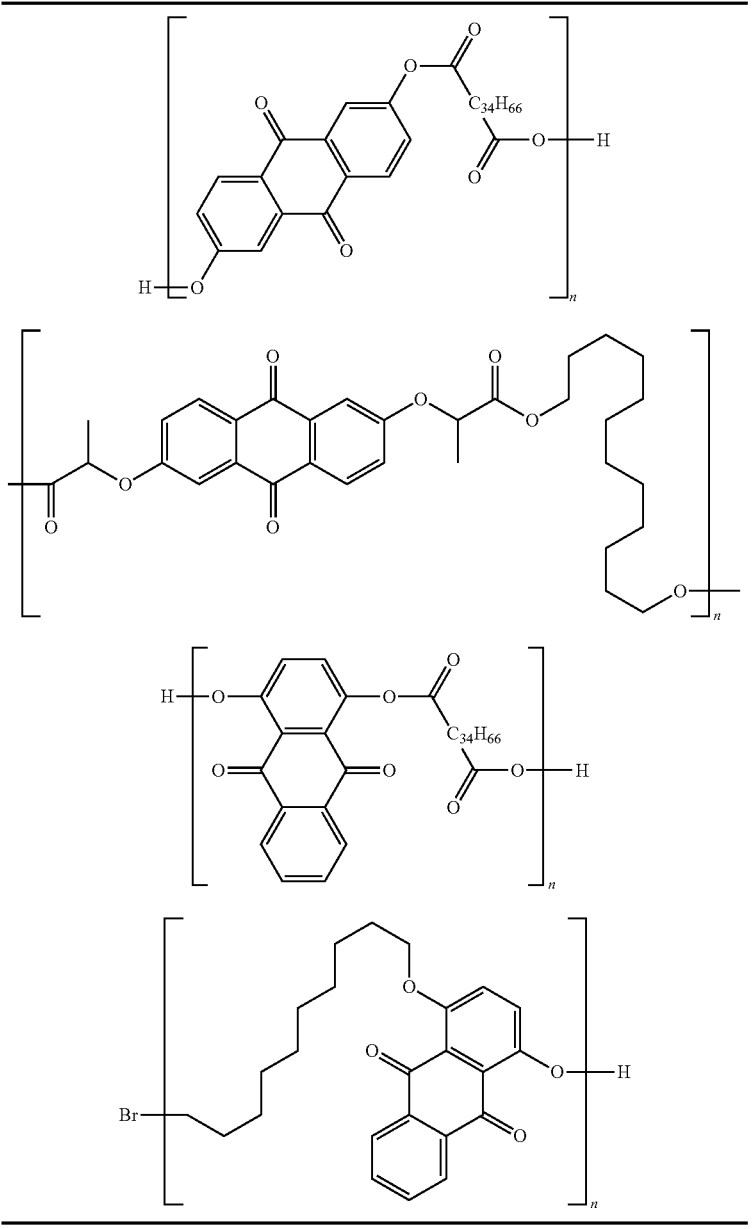

(III) Metal salts based on Co, Ce, Mn, Cu, Ni, Vd. Preferably these salts are metal salts of fatty acids with a carbon number raging from $C_{12}$ to $C_{36}$. Most preferred are metals carboxylates of palmitic ($C_{16}$), stearic ($C_{18}$), oleic ($C_{18}$), linolic ($C_{18}$) and linoleic ($C_{18}$) acid. The transition metal salt is preferably manganese which may be present in a total concentration from 0.001-10 wt %, preferably 0.01-5 wt % and most preferably 0.1-5 wt % based on the polymeric resin. Also possible are aromatic acids such as benzoic acid. Examples for the use of these salts are given in the U.S. Pat. No. 3,840,512 and the U.S. Pat. No. 4,101,720;

(IV) Sacrificial oxidizable substrates like polybutadiene, polyester, squalane, squalene, polystyrene, poly-limonene, poly alpha pinene, poly beta pinene, polynorbornene, poly-lactic acid, mixture of linear and branched alkyl chains alcohol (R: $C_6$-$C_{30}$). Preferably these oxidizable substrates are present in a total concentration from 0.001-10 wt %, preferably 0.01-5 wt % and most preferably 0.1-5 wt % based on the polymeric resin;

and optionally (V) additional components.

Starting materials for the above said compounds are commercially available compounds, for example:

Dihydroxy-anthraquinone
Benzophenone-3,3',4,4'-tetracarboxylic dianhydride
Manganese Stearate
Copper Stearate
Poly-alpha-pinene
Poly-beta-pinene
Poly limonene The optional additional components include:

Fillers and reinforcing agents such as calcium carbonate, silicas, glass fibres, glass bulbs, talc, kaolin, mica, barium sulfate, metal oxides and hydroxides, carbon black, graphite, wood flour, flours of other natural products, synthetic fibers, stearates used as fillers such as calcium stearate on zinc stearate;

Pigments such as carbon black, titanium dioxide in its rutil or anatase forms, and other color pigments;

Light stabilizers, antioxidants and/or further light stabilizers such as e.g.:

1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

18. Ascorbic acid (vitamin C)

19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-di-methyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

20. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

$$[R-CH_2CH_2-COO-CH_2CH_2]_{\overline{2}},$$

where R=3'-tert-butyl-4'-hydroxy-5'-2H-benzotriazol-2-yl-phenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

21. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

22. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

23. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate).

24. Sterically hindered amines, for example carbonic acid bis(1-undecyloxy-2,2,6,6-tetra-methyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a conden-sate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

25. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted ox-anilides and mixtures of o- and p-ethoxy-disubstituted oxanilides.

26. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

processing additives such as antislip/antiblock additives, plasticizers, optical brighteners, antistatic agents and blowing agents.

Antioxidants may be present in amounts to stabilize the polymer during processing and forming steps, however large quantities are undesired in order not to prevent degradation.

The final products can be any type of plastic product for food packaging applications, which needs enhanced oxygen scavenger activities.

For example, the polymeric component may be used to manufacture mono- or multilayer plastic films, sheets, laminates, bags, bottles, styrofoam cups, utensils, blister packages, boxes, package wrappings. The articles may be manufactured by any process available to those of ordinary skill in the art including, but not limited to, extrusion, extrusion blowing, film casting, film blowing, calendering, injection molding, blow molding, compression molding, thermoforming, spinning, blow extrusion and rotational casting. In particular, this is of interest in the area of modify atmosphere ($CO_2$, $N_2$) food packaging. The rate of the oxygen uptake can simply be adjusted by changing the concentration of the additives i.e. if higher oxygen scavenger performance is desired, then higher amount of additives is added.

The oligomeric organic photosensitizers, metal salts, sacrificial oxidizable substrates and optionally other additional components can be admixted with the polymeric resin either simultaneously or in succession, or also immediately prior to the actual processing step.

Hence, the present invention further relates to an article made of or comprising a composition containing a polymeric resin as defined above, oligomeric organic photosensitizers as defined above, metal salt as defined above, sacrificial oxidizable substrates as defined above and optionally additional components as defined above.

The synthesis of the cited examples is best carried out as described in the following Examples. Incorporation of the various additives is best performed in a thermal compounding step, mixing thoroughly the oxidation additives and optional additives, followed by an extrusion of the physical blend at elevated temperature. Typically an extruder with suitable screw configuration is used for this step. The additives can also be added in the form of a preconfectioned masterbatch produced in a different manner. For the production of the desired article any appropriate machine can be used, depending on the final form of the article, for example a blow extruder in the case of films, a cast extrusion machine in the case of sheets or an injection-molding machine.

The invention can be applied in all areas of packaging where oxygen scavenger activity is desired.

In particular, this is of interest in the area of modify atmosphere ($CO_2$, $N_2$) food packaging. The rate of the oxygen uptake can simply be adjusted by changing the concentration of the additives i.e. if higher oxygen scavenger performance is desired, then higher amount of additives is added.

The following examples illustrate the invention without limiting the scope thereof. All percentages and parts are by weight, unless stated otherwise.

| Example | 1 |
|---|---|
| Structure | *(chemical structure)* |
| Physical form | Yellow solid |
| Melting point | 83-93° C. |
| Mn (g/mol) | 2744 |
| Data of thermogravimetric analysis/weight loss | 260° C.: 0.41%; 280° C.: 0.57%; 300° C.: 0.87% |

| Example | 2 |
|---|---|
| Structure | *(chemical structure)* |
| Physical form | Yellow solid |
| Melting point | 166-174° C. |
| Mn (g/mol) | 1038 |
| Data of thermogravimetric analysis/weight loss | 260° C.: 1.90%; 280° C.: 2.00%; 300° C.: 2.21% |

| Example | 3 |
|---|---|
| Structure | *(chemical structure)* |
| Physical form | Slightly brown solid |
| Melting point | 127-135° C. |
| Mn (g/mol) | N.A. |
| Data of thermogravimetric analysis/weight loss | 210° C.: 0.51%; 260° C.: 1.13%; 300° C.: 7.47% |

All chemicals were used as received and not purified prior to synthesis. Synthesis of the above compounds 1, 2, 3 is described in the WO 2009/016083 A1.

Riblene GP20® low density polyethylene has been obtained from Polimeri Europa; Dercolyte® is a poly terpene product obtain from Les Dérivés Résiniques & Terpéniques; Manganese Stearate, $Mn(C_{18}H_{35}O_2)_x$, has been purchased from Shepherd Chemical; Copper Stearate, $Cu(C_{18}H_{35}O_2)_x$, has been purchased from H.L. Blachford Ltd and Shelfplus $O_2$ 2400® has been obtain from ALBIS Chemicals.

Comparative Sample A:

600 mg of Dercolyte S125 and 25 mg of Manganese Stearate have been dissolved in 5 mL of DMA. The solution is exposed to air (20.7% oxygen) in 100 ml sealed flasks provided with a septum that allowed portions of the inside atmosphere to be drawn for analysis at different time using a syringe.

Once filled with air the sealed flask was exposed to light in a ATLAS Weatherometer (model Ci65A) equipped with a 6500 W Xenon lamp (continuous light cycle, black panel temperature=63° C.) for 30 minutes.

After WOM exposure the sample was kept at 40° C. without stirring and oxygen concentration measures were carried out using a Mocon Pac Check 450 head space analyzer over 48 hours time.

Comparative Sample E:

600 mg of Dercolyte S125 and 25 mg of Copper Stearate have been dissolved in 5 mL of DMA. The sample has been processed as described in Comparative Sample A.

Inventive Sample F:

600 mg of Dercolyte S125, 25 mg of Copper Stearate and 30 mg of compound of Example 1 have been dissolved in 5 ml of DMA. The sample has been processed as described in Comparative Sample A.

Inventive Sample G:

600 mg of Dercolyte S125, 25 mg of Copper Stearate and 30 mg of compound of Example 2 have been dissolved in 5 ml of DMA. The sample has been processed as described in Comparative Sample A.

Inventive Sample H:

600 mg of Dercolyte S125, 25 mg of Copper Stearate and 30 mg of compound of Example 3 have been dissolved in 5 ml of DMA. The sample has been processed as described in Comparative Sample A.

The results in terms of $O_2$%/Time are reported in Table 2.

Oxygen % left in the sealed flask at different time. Samples have been stored at 40° C. Oxygen measurement was carried out when samples were at room temperature.

TABLE 2

| % $O_2$/Time | 0 Hours | 3 Hours | 6 Hours | 24 Hours | 27 Hours | 30 Hours | 48 Hours |
| --- | --- | --- | --- | --- | --- | --- | --- |
| Comparative Sample E | 19.8 | 18.6 | 18.6 | 18.2 | 18.2 | 18.2 | 18.1 |
| Inventive Sample F | 19.7 | 16.0 | 15.0 | 13.3 | 13.1 | 13.6 | 13.3 |
| Inventive Sample G | 19.7 | 13.5 | 13.2 | 12.0 | 11.9 | 11.9 | 12.3 |
| Inventive Sample H | 19.7 | 14.8 | 14.7 | 14.4 | 14.4 | 14.6 | 14.6 |

Inventive Sample B:

600 mg of Dercolyte S125, 25 mg of Manganese Stearate and 30 mg of compound of Example 1 have been dissolved in 5 ml of DMA. The sample has been processed as described in Comparative Sample A.

Inventive Sample C:

600 mg of Dercolyte S125, 25 mg of Manganese Stearate and 30 mg of compound of Example 2 have been dissolved in 5 ml of DMA. The sample has been processed as described in Comparative Sample A.

Inventive Sample D:

600 mg of Dercolyte S125, 25 mg of Manganese Stearate and 30 mg of compound of Example 3 have been dissolved in 5 ml of DMA. The sample has been processed as described in Comparative Sample A.

The results in terms of $O_2$%/Time are reported in Table 1.

Oxygen % left in the sealed flask at different time. Samples have been stored at 40° C. Oxygen measurement was carried out when samples were at room temperature.

Oxygen Scavenger Activity in LDPE Film:

Comparative Sample 1:

Shelfplus $O_2$ 2400® was mixed with low density polyethylene, Riblene® so that the final Iron concentration was 7.0% by weight. Compounds were prepared with an OMC pilot double screw extruder (model EBV 19/25, with a 19 mm screw diameter and 1:25 ratio), and 50 micron-thick films were prepared using Collin Cast Flat-die Extruder model 30×25 L/D (30 mm screw diameter, 1:25 diameter/length ratio).

Comparative Sample 2:

2.0% of polyterpenic resin Dercolyte® S125 and 0.2% of Manganese Stearate were mixed with low density polyethylene, Riblene®. Compounds and Film were prepared as described in Compartitive Sample 1.

Comparative Sample 3:

2.0% of polyterpenic resin Dercolyte® S125 was mixed with low density polyethylene, Riblene®. Compounds and Film were prepared as described in Comparative Sample 1.

TABLE 1

| % $O_2$/Time | 0 Hours | 3 Hours | 6 Hours | 24 Hours | 27 Hours | 30 Hours | 48 Hours |
| --- | --- | --- | --- | --- | --- | --- | --- |
| Comparative Sample A | 19.9 | 18.6 | 18.4 | 17.3 | 17.5 | 17.3 | 16.1 |
| Inventive Sample B | 20.0 | 16.8 | 15.9 | 10.7 | 10.2 | 9.3 | 9.2 |
| Inventive Sample C | 19.9 | 14.9 | 13.8 | 9.1 | 8.5 | 8.1 | 7.9 |
| Inventive Sample D | 19.9 | 15.4 | 14.6 | 10.2 | 9.8 | 9.0 | 8.7 |

Inventive Sample 4:
2.0% of polyterpenic resin Dercolyte® S125, 0.2% of Manganese Stearate and 0.2% of compound of Example 1 were mixed with low density polyethylene, Riblene®. Compounds and Film were prepared as described in Comparative Sample 1.

Inventive Sample 5:
2.0% of polyterpenic resin Dercolyte® S125, 0.2% of Manganese Stearate and 0.2% of compound of Example 2 were mixed with low density polyethylene, Riblene®. Compounds and Film were prepared as described in Comparative Sample 1.

Inventive Sample 6:
2.0% of polyterpenic resin Dercolyte® S125, 0.2% of Manganese Stearate and 0.2% of compound of Example 3 were mixed with low density polyethylene, Riblene®. Compounds and Film were prepared as described in Comparative Sample 1.

Several aliquots of film for each samples were then exposed in an ATLAS Weatherometer (model Ci65A) equipped with a 6500 W Xenon lamp (continuous light cycle, black panel temperature=63° C.) for 5 minutes Film samples were then exposed to air (20.7% $O_2$) in 500 ml sealed flasks provided with a septum that allowed portions of the inside atmosphere to be drawn for analysis at several intervals using a syringe. Oxygen concentration measures were carried out using a Mocon Pac Check 450 head space analyzer over 28 days. The actual iron concentration in Comparative Sample 1 was measured by ICP-OES (Inductively Coupled Plasma-Optical Emission Spectrometer, Perkin Elmer Optima Series 4200DV). The results in terms of ml $O_2$/g of active scavenger are given in Table 3.

Averaged oxygen scavenger activity (ml $O_2$/g Scavenger) for six different LDPE film measured after 28 days. In case of Comparative Sample 1*: g of active scavenger=g of iron in the film; in all the other cases: g. of active scavenger=g. of Dercolyte+g. of metal complex+g. of photosensitizer molecule.

TABLE 3

|  | ml $O_2$/g Scavenger After 28 Days |
| --- | --- |
| Comparative Sample 1* | 36 |
| Comparative Sample 2 | 49 |
| Comparative Sample 3 | No $O_2$ uptake detectable |
| Inventive Sample 4 | 84 |
| Inventive Sample 5 | 78 |
| Inventive Sample 6 | 69 |

Table 3 clearly shows that oxygen scavenger reactivity of Inventive Samples from 4, 5 and 6 is greater than the oxygen scavenger activity of Comparative Sample from 1 to 3.

The amount of oxygen adsorbed by the test samples was determined from the change in the oxygen concentration in the head space of a sealed glass container. The test container had a headspace volume of about 500 ml and contained atmospheric air so that about 100 ml of oxygen were available for reaction with the iron particles. In all the examples oxygen scavenger component percentages are in weight percents based on total weight of the film composition.

Description of Oxygen Uptake Method:
Film thickness is measured and 4.0 grams of film are weighted. The extruded film is folded and placed in a clean 500 ml sealed glass container. A vial containing 15 ml of deionized water is added to produce 100% relative humidity inside the glass container (only for Comparative Sample 1).

The oxygen content in the ambient air on day 0 (i.e. equal to the initial oxygen content in the sealed glass container) is tested and recorded using a Mocon Oxygen Analyzer.

The glass containers with test films and water vials are stored at 22° C. (generally, room temperature) for 28 days.

The oxygen content in the sealed glass containers using a Mocon Oxygen Analyzer on day 28 are tested and recorded.

Based on the measured oxygen concentration that is left in the sealed glass container the volume of oxygen absorbed per gram of Scavenger has been calculated using the formula:

Oxygen absorbed (ml/g)={(% $O_2$)$_i$−(% $O_2$)$_f$}*0.01*$V_j$/($W_F$*$W_S$/$W_B$)

where:
(% $O_2$)$_i$ Initial oxygen concentration in the sealed glass container (%)
(% $O_2$)$_f$ Oxygen concentration in the sealed glass container at day of test (%)
0.01: Conversion factor
$V_j$: Free air volume of the sealed glass container (ml) (total volume of the sealed glass container less space occupied by vial and film, typically 440 ml)
$W_F$: Weight of film placed into the glass container (typically 4.0 g)
$W_S$: Weight of Oxygen Scavenger used to make blend (g)
$W_B$: Total weight of blend (g)

The invention claimed is:
1. An oxygen-scavenging composition for food packaging applications comprising:
(I) a polymeric resin,
(II) an oligomeric photosensitizer selected from the group of photosensitizers consisting of:

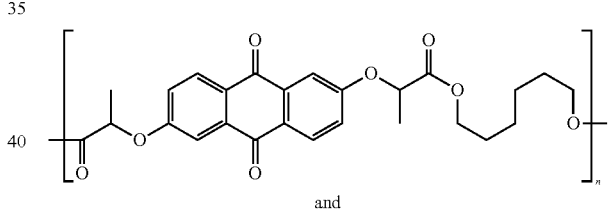

and

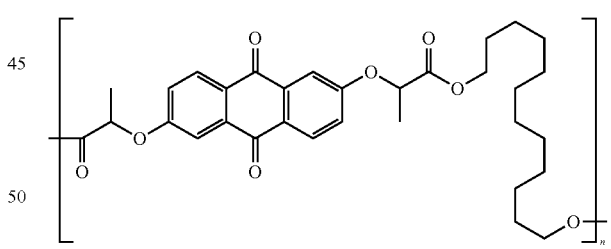

wherein n is a number from 2 to 10,
(III) a metal salt,
(IV) a sacrificial oxidizable substrate
and optionally,
(V) additional components as recited by the instant claims.
2. The oxygen-scavenging composition according to claim 1 wherein the polymeric resin is a thermoplastic polymer selected from the group consisting of homo- or copolymers of olefin monomers, copolymers of olefin monomers with diolefin monomers, cyclic olefins, copolymers of one or more 1-olefins or diolefins with carbon monoxide, copolymers of one or more 1-olefins and diolefins with carbon monoxide and polyvinyl alcohol.

3. The oxygen-scavenging composition according to claim 1 wherein the metal salt comprises an ion of a metal selected from Co, Ce, Mn, Cu, Ni Vd.

4. The oxygen-scavenging composition according to claim 1 wherein the sacrificial oxidizable substrate is selected from the group consisting of a polybutadiene, a polyester, squalane, squalene, a polystyrene, a poly-limonene, a poly alpha pinene, a poly beta pinene, a polynorbornene, a polylactic acid and a mixture of linear and branched alkyl chain $C_6$-$C_{30}$ alcohols.

5. The oxygen-scavenging composition according to claim 1 which further comprises one or more components selected from the group consisting of fillers, reinforcing agents, pigments, light stabilizers, antioxidants, antislip or antblock additives, plasticizers, optical brighteners, antistatic agents and blowing agents.

6. The oxygen-scavenging composition according to claim 1, wherein the polymeric resin (I) and the sacrificial oxidizable substrate (IV) are different.

7. The oxygen-scavenging composition according to claim 1, wherein the sacrificial oxidizable substrate (IV) is a polyterpenic resin.

8. An article the oxygen-scavenging composition as defined in claim 1.

9. The article according to claim 8, which is a film, a sheet or a laminate.

10. The article according to claim 9 which is a coextruded multilayer film.

11. The article according to claim 9 which is a food packaging.

12. The composition according to claim 1, wherein
(I) the polymeric resin is a thermoplastic polymer selected from the group consisting of homo- or copolymers of olefin monomers, copolymers of olefin monomers with diolefin monomers, cyclic olefins, copolymers of one or more 1-olefins or diolefins with carbon monoxide, copolymers of one or more 1-olefins and diolefins with carbon monoxide and polyvinyl alcohol,
(III) the metal salt is Cu stearate or Mn stearate and
(IV) the sacrificial oxidizable substrate is at least one substrate selected from the group consisting of polybutadiene, polyester, squalane, squalene, polystyrene, poly-limonene, poly alpha pinene, poly beta pinene, polynobornene, polylactic acid and a mixture of linear and branched alkyl chain $C_6$-$C_{30}$alcohols.

13. The composition according to claim 1, wherein
(I) the polymeric resin is polyethylene,
(III) the metal salt is Cu stearate or Mn stearate and
(IV) the sacrificial oxidizable substrate is a polyterpenic resin.

* * * * *